April 2, 1968 L. G. VLAMINCK 3,376,542

TELEPHONE TERMINAL BLOCK HAVING SNAP-ON CONNECTOR STRIP

Filed Oct. 4, 1965 2 Sheets-Sheet 1

INVENTOR
LEOPOLD G. VLAMINCK
BY
ATTY.

April 2, 1968 L. G. VLAMINCK 3,376,542

TELEPHONE TERMINAL BLOCK HAVING SNAP-ON CONNECTOR STRIP

Filed Oct. 4, 1965 2 Sheets-Sheet 2

INVENTOR
LEOPOLD G. VLAMINCK

BY [signature]
ATTY.

United States Patent Office 3,376,542

Patented Apr. 2, 1968

3,376,542

TELEPHONE TERMINAL BLOCK HAVING SNAP-ON CONNECTOR STRIP

Leopold G. Vlaminck, Berchem-Antwerp, Belgium, assignor to Automatic Electric Laboratories Inc., Northlake, Ill., a corporation of Delaware Filed Oct. 4, 1965, Ser. No. 492,805
4 Claims. (Cl. 339—125)

ABSTRACT OF THE DISCLOSURE

A telephone terminal block comprising a base attached to a support surface, at least one connector strip removably mountable, in snap-on fashion, on said base, and a multi-terminal plug adapted to be mated with the connector strip. The conductors of a pre-installed telephone cable are connected to the terminals of the connector strip prior to the strip and grommet-held end portion of the telephone cable being mounted on the base; after which the multi-terminal plug, also prewired to a telephone conductor cord, is mated with the connector strip. A snap-on cover, having ribs on the inside surface thereof to secure the end portion of the cable to the base, is placed over the base, enclosing the connector strip and plug.

This invention relates to terminal blocks, and in particular to a multi-connection, jack-in terminal block for use in the installation of telephone sets.

The idea underlying the present invention is to provide a separate terminal block, to which all installation cables may be connected, without the presence of the telephone sets. These latter may be connected to the installation by multi-terminal plugs, only at the moment they are really required, so that they should not suffer damage from interior finishing work in new buildings.

Because many of the modern telephone sets used in office buildings, etc., no longer have simply a single line, many more wires are needed to connect up these multi-line sets. Therefore, when these incoming lines are installed in a newly constructed building, provision must be made to terminate them in such a manner that when, at a later date, the telephone sets are connected to the outside lines, connection may be made simply and quickly. The terminal block of the present invention was designed to provide this type of installation and at the same time to provide a connector which is able to accommodate a large number of telephone lines in an orderly manner.

Accordingly, it is an object of this invention to provide a multi-line connector block which can readily connect telephone set wires to incoming telephone conductors within a minimum time and with minimum effort.

A feature of this invention is a snap-out block with removable connector strips which provides for ease in installing incoming telephone lines and allows a choice of the number of terminals to be used in a given block.

Another feature is a terminal block with a jack-in type connection which is made when the telephone set wires are connected to the incoming telephone conductor terminated at the terminal block.

Still another feature of the invention is a terminal block having a U-shaped bracket which is received in an aperture having grooved edges. The bracket receives a grommet into which a cable is fitted, to secure the cable in position in the terminal block.

Another feature of the invention is a terminal block of the above kind and having a cover portion with cam portions for snap-on cooperation with the base portion of the terminal block.

Other objects and features of the invention will become more apparent by reference to the following description of an embodiment thereof, taken in conjunction with the accompanying drawings of which:

Figure 10A:
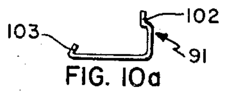

FIG. 10*a* is a side view of a bracket in the base portion of a terminal block according to the invention, for receiving a grommet through which telephone subset installation cable is fitted.

Figure 10B:
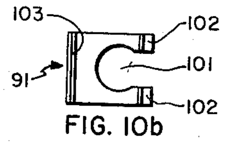

FIG. 10*b* is a top view of the bracket in FIG. 10*a*.

The embodiment of the terminal block shown in the aforementioned drawings happens to be primarily designed for series interconnected telephone sets, which means that all intermediate telephones in the installation are connected by a cable coming from a preceding terminal block in the series and by a cable going to the following terminal block. However, this is only one use for the terminal block according to the invention. It may also be used for connecting a single telephone subset to an installation cable or for the connection of other types of telephones.

Figure 1:
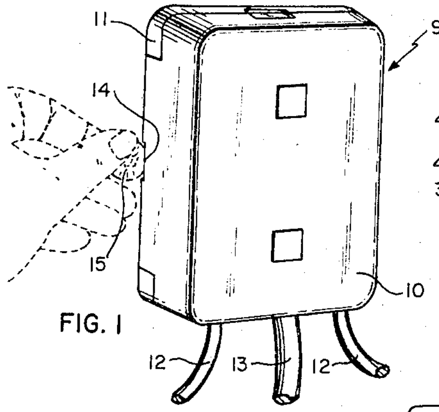
FIG. 1 is a perspective view of a terminal block according to the invention with its cover portion in place on its base portion; and in dotted lines, the hand of a person who is preparing to use a coin to remove the cover portion.

FIG. 1 shows terminal block 9 as it appears installed with cover portion 10 in place on base portion 11. Incoming and outgoing cables 12, which comprise the telephone conductors used to connect a plurality of like terminal blocks in series, and telephone cord or cable 13, which comprises the wires which terminate at the telephone set are shown entering the bottom portion of terminal block 9.

Also shown in FIG. 1 is the use of a coin 15 to be inserted and twisted in slot 14, to remove cover portion 10 from base portion 11, eliminating the need for screws or special tools.

Figure 2:
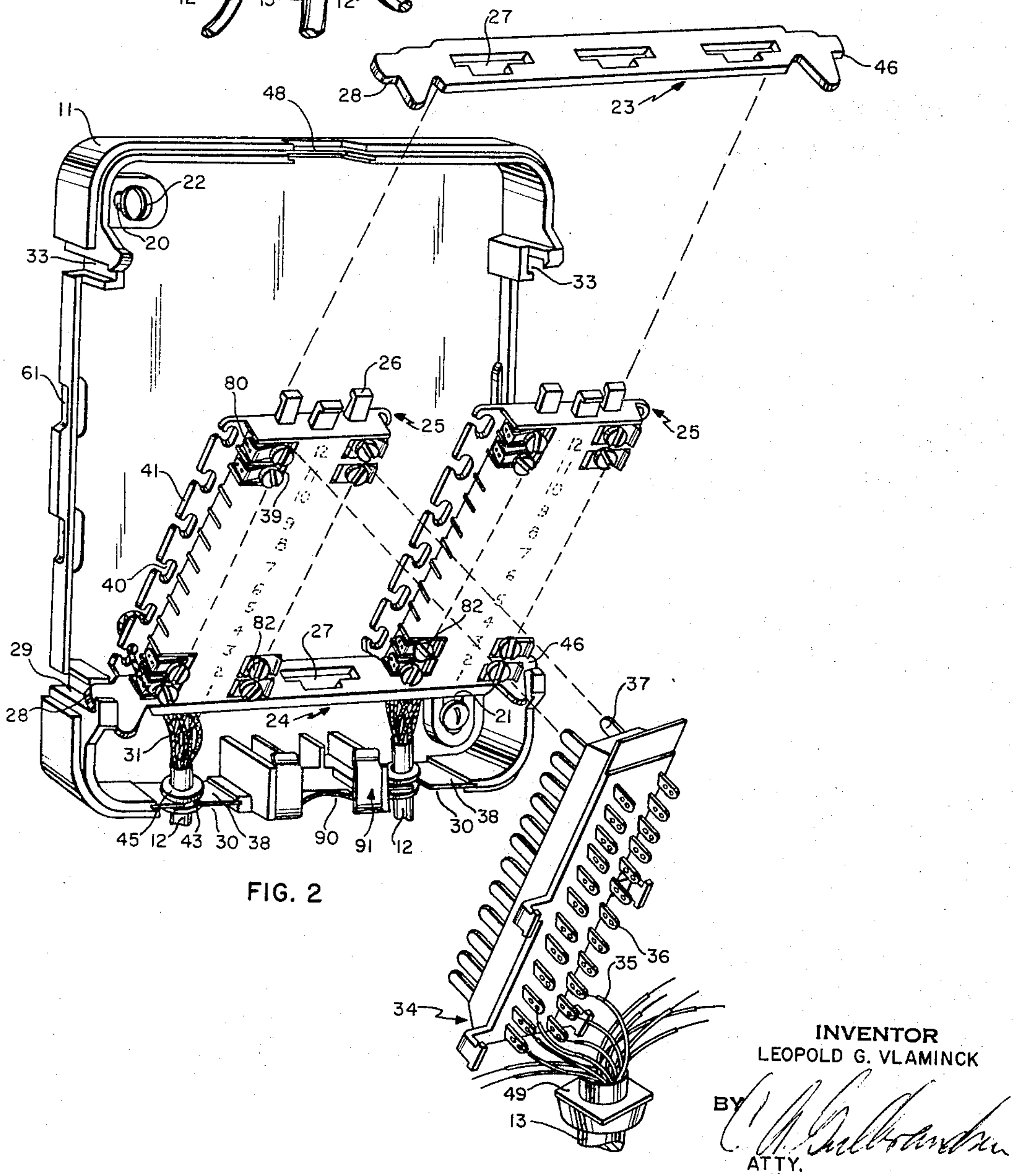
FIG. 2 is an exploded perspective view of the terminal block of FIG. 1 with its cover portion removed.

FIG. 2 shows an exploded perspective view of terminal block 9 of FIG. 1 with cover portion 10 removed. Apertures 20 and 21 in base portion 11 are for mounting base portion 11 on a suitable support surface by means of screws such as 22. Crossbars 23 and 24, comprise a snap-on frame into which connector strips, such as 25, are removably mounted by inserting ends, such as 26 through apertures, such as 27 in crosbars 23 and 24, where they will fit securely.

In the embodiment shown in FIG. 2, the terminal block has been assumed to be equipped with two connector strips fitting into the outer slots, such as 27, in crossbars 23, 24, thus permitting up to twelve, twenty-four, thirty-six or forty-eight terminal connections. As can been seen from FIG. 2 the terminal block has not been shown in its final, fully assembled position. Crossbar 23 has been separated from the connector strip to illustrate the manner in which it will be snapped into position on the end portions such as 26 of connector strips 25. Lower crossbar 24 is in place in protruding portion 29, but is at an angle to allow for the separation of crossbar 23. Also, separately shown in FIG. 2 is male plug 34, which will be plugged into the left connector strip 25 after all the connections have been made and the telephone set (not shown) which is connected to male plug 34 via cable 13 is ready to be installed.

Figure 9:
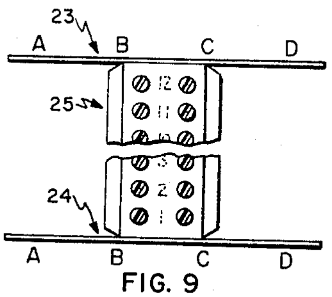
FIG. 9 shows an alternate arrangement for the terminal block, according to the invention.

By way of alternative, a single connector strip may be used, as shown in FIG. 9, thereby permitting up to twelve or twenty-four terminal connections instead. However, the terminal block does not have to be of the sizes shown; it may be manufactured, according to the invention, with more or less connector strips or terminals as needed. Also shown in FIG. 9 is the coordinate system composing columns marked A–B–C–D and rows marked from one to twelve, chosen in the particular embodiment of the terminal block of FIG. 2, enabling one to easily pick out a specific terminal; for example, in the B column, terminal twelve or B–12.

Figure 3:
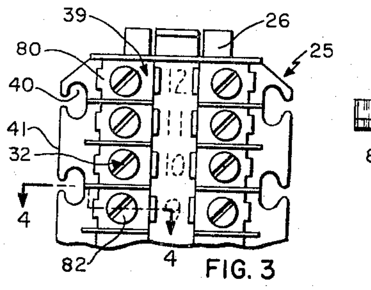
FIG. 3 is a front view of a portion of one of the connector strips shown in FIG. 2.
Figure 4:
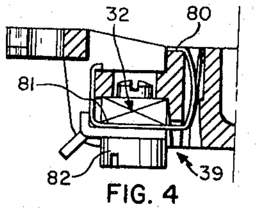
FIG. 4 is a magnified sectioned view along the line 4—4 of a single terminal in the connector strip shown in FIG. 3.

FIGS. 3 and 4 show more clearly the connector strip 25 of FIG. 1. FIG. 3 shows that in the particular embodiment of the invention illustrated herein there are twelve rows and two columns of the female terminals, such as 39, to a connector strip. FIG. 4 shows the actual construction of a female terminal in connector strip 25. As can be seen, the terminal is of one piece construction and comprises a resilient section 80 to form the female portion of the terminal, and another portion 81 into which a screw 82 is received to form the screw portion of the terminal.

Figure 5:
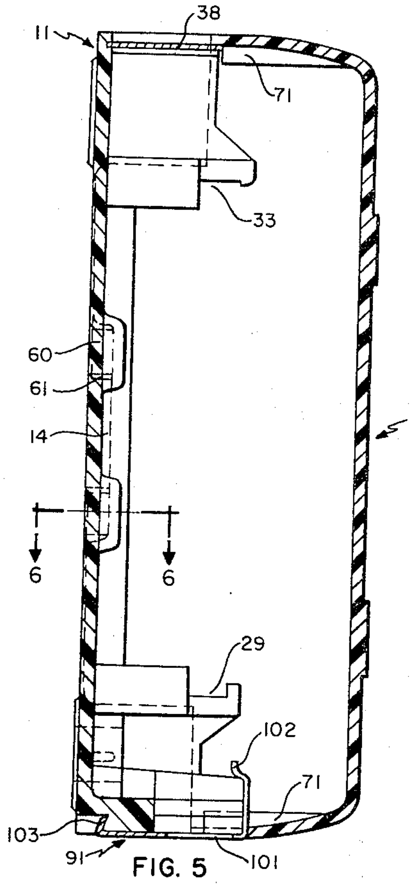
FIG. 5 is a sectioned side view of the terminal block according to the invention with its cover portion in place, but with its connector strips and associated parts removed.

FIG. 5 shows a side sectioned view of the terminal block to illustrate the manner in which bracket 91 which receives the telephone set installation cable, clips onto the base portion of hte terminal block. Also shown are ribs 71 on the cover portion of the terminal block which serve to hold grommet such as 45 and bracket, such as 38, shown in FIG. 2, in position in apertures such as 30. These ribs 71 apply pressure when the cover portion is in place and thereby keep the cables in place.

Figure 6:
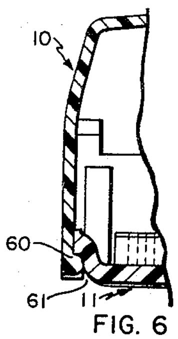
FIG. 6 is a sectioned view of FIG. 5 taken along the line 6—6.

FIG. 6 shows a sectioned view of FIG. 5 along line 6—6 to illustrate that a portion 60 of the edge of cover portion 10 is rounded to provide a camming action for ease in snapping cover portion 10 into notches 61 in base portion 11.

Figure 7:
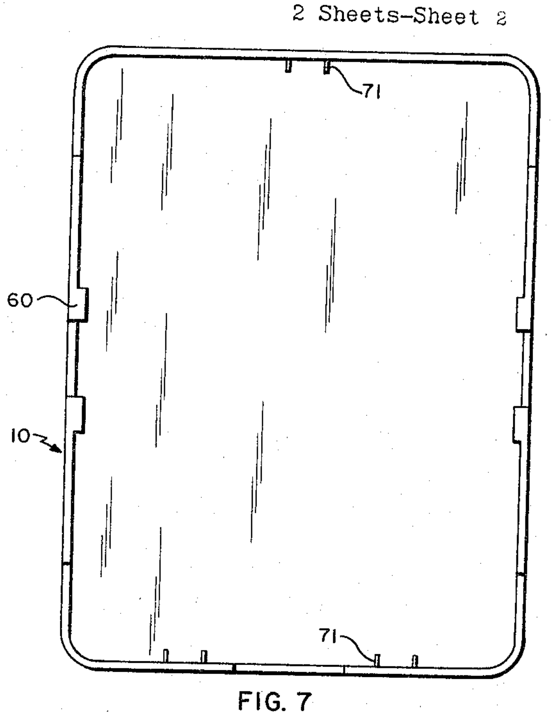
FIG. 7 shows cover portion according to the invention viewed from its open end.

FIG. 7 illustrates the inner surface of cover portion 10 where ribs such as 71 are more easily seen.

Figure 8:
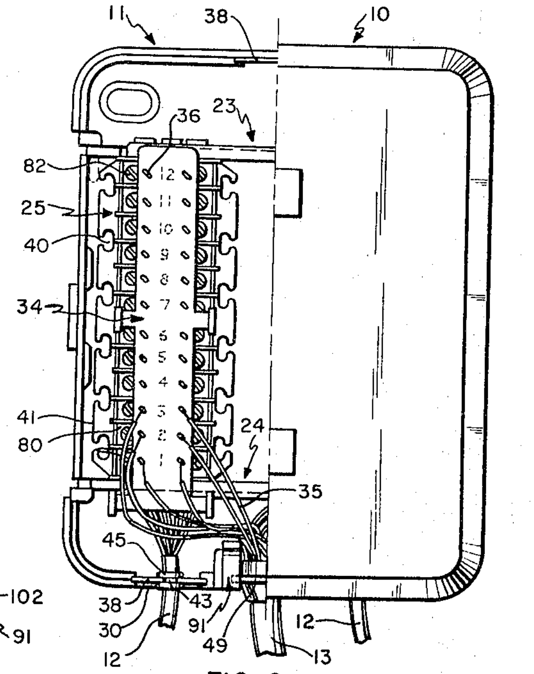
FIG. 8 is a front, partially cut-away view of an assembled terminal block according to the invention.

FIG. 8 shows a cut away front view of the terminal block fully assembled and installed with cover portion 10 on base portion 11 and male plug 34 inserted into female connector strip 25.

It is also to be noted that in a preferred embodiment of the invention the body of male plug 34, connector strips 25 and two frame crossbars 23 and 24 will be injection molded of polycarbonate which is an almost unbreakable plastic material with excellent insulation characteristics. The cover portion 10 and base portion 11 may be made of A.B.S. material. However, suitable substitutes for the above mentioned materials may be used.

Also male terminals may be made of nickel-silver while the female portion of the female terminals may be made of nickel plated phosphorbrons. These again may be replaced by a suitable substitute.

A detailed explanation of the actual installation and used of the terminal block according to the invention is as follows:

First, base portion 11 must be fastened to a suitable support surface by means of apertures 20 and 21 with screws such as 22 (FIG. 2) located entirely out of the way of any cabling which will take place. Next, the number of wires needed to install the particular telephone set must be ascertained. If the number is relatively small, an arrangement such as that shown in FIG. 9 with one connector strip located in the center of the frame may be used; if more wires are needed, two connector strips, one on each side of the frame may be used, as shown in FIG. 2.

Assuming two connector strips are needed, they are first snapped into position on the frame. Looking at FIG. 2, end portions such as 26 of connector strip 25 are inserted into apertures 27 of frame portions or crossbars 23 and 24. With the frame and associated connector strips removed from base portion 11, the telephone conductors, such as 31, in incoming and outgoing cables 12 are brought in through lower apertures, such as 30. After the conductors have had their insulation removed, lower frame piece 24 is set into position on protruding portion 29 (shown best in FIG. 5) of base portion 11, and in turn the respective connections are made to screw portions 32 of female terminals, such as 39.

It is to be noted that the aforementioned method of introducing cables into the terminal block of the invention eliminates the need to bind-off the cables with stitch bindings as in previous terminal blocks, thus reducing considerably the installation labor cost.

As shown in FIG. 2, the conductors are brought through slots, such as 40 in fanning strips, such as 41, located along the edges of connector strip 25 so the wires will be neatly channelled to their respective terminals. In this way, an orderly arrangement results for a repairman and the installer. It is also to be noted that the sides of apertures, such as 30, are grooved to receive a flat mounting bracket, such as 38, which has through its center a slotted aperture 43. This slotted aperture 43 is for receiving a grommet, such as 45, which has been placed around cables 12 to hold the cables securely so they cannot be easily pulled from the terminal block.

Aperture 48 located at the top of base portion 11 is similar to apertures 30, but aperture 48 to is to be used only when the cabling to be done exceeds the capacity of the lower apertures.

The telephone sunset cord is brought in through aperture 90 in the bottom center of the terminal block. Here, however, a flat bracket, such as 38 is not employed. Instead, a generally L-shaped snap-on bracket 91, illustrated in detail in FIGS. 10*a* and 10*b* and shown snapped into position in FIG. 5, is used with a grommet (shown in FIG. 2) again being supplied around the cord.

As can be seen from FIGS. 10*a* and 10*b*, bracket 91 has a circular aperture 101 for receiving a grommet (shown in FIG. 2). Ends 102 and 103 are bent to provide the necessary grabbing effect to hold bracket 91 onto base portion 11, as shown in FIG. 5.

Upon completion of the necessary connections, end portions 28 and 46 of upper frame piece 23 are snapped into place in slots, such as 33 (also shown in FIG. 5).

At this point, before the telephone sets are connected up, it is easy to check the installation and all insulation measures. Now, cover portion 10 shown in FIG. 1, may be put into position on base portion 11 until a telephone subset is ready to be installed. Referring to FIGS. 5 and 6, it can be seen that a section of the edge of cover portion 10 is rounded 60 (shown in FIG. 6), to provide a cam surface for ease in snapping cover portion 10 onto base portion 11 in notches, such as 61.

When the time comes for a subset to be put into service, cover portion 10 is removed as shown in FIG. 1, and the subset wires, such as 35 in cable 13 are connected to male plug 34. Wires such as 35 are connected to terminal pins, such as 36, shown here as solder terminals, but which may be solderless wrap terminals or any other suitable type. When all the necessary wires are in place, plug-in portions, such as 37 of male terminals, such as 36, are inserted into respective female terminals, such as 39.

The terminals of male plug 34 are held securely in the body of the plug, but in such a way that each plug-in portion is sufficiently free to secure a close and independent contact with its associated female terminal.

Cable 13 is then brought out through aperture 90 at the bottom of base portion 11 where a bracket 91 and grommet 49 are used to secure cable 13 in place. Cover portion 10 is replaced and now the telephone set is ready for use (see FIG. 8).

Located on the inside of cover portion 10 are ribs, such as 71. These ribs 71 provide the necessary pressure against bracket 38, when cover portion 10 is in place on base portion 11, to prevent movement in the locking brackets and to keep the cables in place.

In summary then, the invention provides a separate terminal block, to which all installation cables may be connected, without the presence of the telephone sets. These latter may be connected to the installation by multi-terminal plugs, only at the moment they are really required. Specifically, the terminal block shown has been designed for use with a mixed service, that is, trunk connected intercom, telephone. These sets may be of the type having one central office line and two extension telephones as well as the type having four central office lines and ten extension telephones.

Thus, the terminal block according to the embodiment shown, is not too large for smaller sets and will still provide ample installation facilities for the more complicated multi-line telephone sets.

It will be obvious to those skilled in the art that changes and modifications may be made without departing from this invention in its broadest aspects and therefore the aim in the appended claims is to cover all such changes and modifications as in the true spirit and scope of this invention.

What is claimed is:

1. A terminal block for quickly connecting the wires of a telephone subset cord to the end portion of at least one pre-installed multiconductor telephone cable, comprising:

a base having means for attaching said base to a support surface;

at least one multi-terminal connector strip;

snap-on means for removably mounting said connector strip, as a whole, on said base and means for removably mounting said end portion of the multiconductor cable on said base, so that said strip may be connected to said end portion of the cable prior to the mounting of said strip and said end portion on said base, and that said strip and said end portion connected thereto may be removed as a unit from said base;

a multi-terminal plug designed to mate with the terminals on said conductor strip and preconnectable to the wires of said telephone subset cord; and a cover enclosing said base, said connector strip and said plug.

2. A terminal block as claimed in claim 1 wherein said snap-on means includes frame members removably mounting a plurality of said connector strips and wherein said base has portions into which said frame members may be snapped.

3. A terminal block as claimed in claim 1 wherein said cover has, on its inner surface facing said base, ribs for holding said second-mentioned mounting means in place when said cover is attached to said base.

4. A terminal block as claimed in claim 3 wherein said second-mentioned mounting means includes an aperture in said base, a flat U-shaped bracket removably and slidably received by said aperture and a grommet surrounding said end portion of the cable and received by the U of said bracket.

References Cited

UNITED STATES PATENTS

| | | | |
|---|---|---|---|
| 1,742,850 | 1/1930 | Douglas | 339—24 |
| 2,360,304 | 10/1944 | McLoughlin et al. | 339—198.4 |
| 2,431,999 | 12/1947 | Englehardt | 339—198.4 |
| 2,659,872 | 11/1953 | Gilbert. | |
| 3,124,403 | 3/1964 | Rowe. | |
| 3,187,296 | 6/1965 | Brackett. | |

FOREIGN PATENTS

| | | |
|---|---|---|
| 552,503 | 4/1943 | Great Britain. |

R. S. STROBEL, *Assistant Examiner.*

MARVIN A. CHAMPION, *Primary Examiner.*